March 9, 1926.
E. A. NOONAN ET AL
HAT HOLDER
Filed Sept. 27, 1923
1,576,452
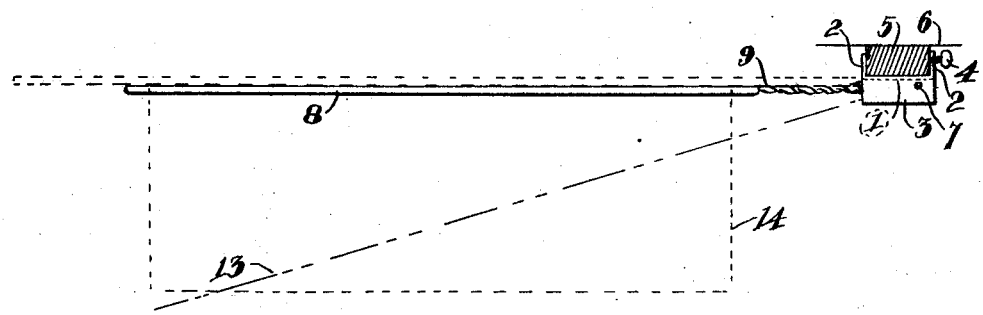
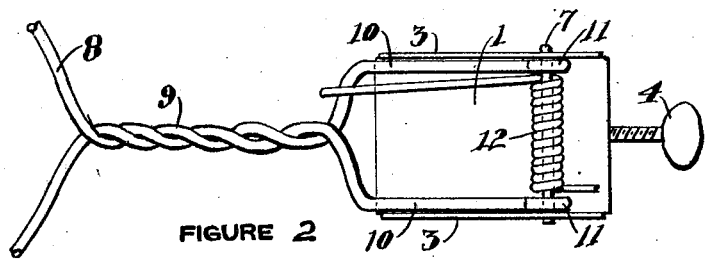
INVENTORS Patented Mar. 9, 1926.

1,576,452

UNITED STATES PATENT OFFICE.

EDMOND A. NOONAN AND WALTER H. KERR, OF SAN JOSE, CALIFORNIA.

HAT HOLDER.

Application filed September 27, 1923. Serial No. 665,216.

*To all whom it may concern:*

Be it known that we, EDMOND A. NOONAN and WALTER H. KERR, citizens of the United States, and residents of San Jose, in the county of Santa Clara and State of California, have invented certain new and useful Improvements in Hat Holders, of which the following is a specification.

Our invention relates particularly to a device for holding a hat in an automobile and detachably mounted on the top thereof.

It is one of the objects of our invention to provide a device of the character indicated that can be securely mounted on the cross bar forming a part of the framework of an automobile top.

It is another object of the invention to provide a device of the character indicated in which the holder proper is resiliently mounted on the cross bar whereby it may be readily positioned for placing a hat therein and automatically returned to a normal position in substantially parallel relation to the automobile top.

Finally, it is an object or our invention to provide a device of the character indicated that will be simple in form and construction, economical to manufacture, easily and quickly applied, and highly efficient in its practical application.

In the drawing:—

Figure 1 is a side elevation of the device in position on an automobile top.

Figure 2 is an enlarged bottom view of the device, part being broken away.

Referring more particularly to the drawing, we show at 1 a body portion comprising a plate having upwardly extending front and rear flanges 2 and downwardly extending side flanges 3. Rear flange 2 is fitted with a thumb screw 4 whereby the device may be rigidly mounted upon a cross bar 5 of an automobile top 6.

Arranged transversely of the body 1 and set in side flanges 3 is a pin 7. At 8 we show a wire loop having both ends twisted together for a distance as at 9 and then separated and formed into parallel and spaced end portions 10 provided with terminal loops 11, engaging pin 7 as shown. On pin 7 and between loops 11 is arranged a coiled spring 12, one end extending outwardly and engaging the under surface of an end portion 10 of loop 8, and the other end extending outwardly in the opposite direction and engaging the under surface of body portion 1 whereby the loop 8 is normally held in a plane lying substantially parallel to the plane in which the body portion 1 lies.

In its practical application the body portion 1 is clamped on to the cross bar 5 as shown and in rigid relation thereto. When desired the loop 8 may be drawn down against the tension of spring 12 into the position indicated by the dotted center line 13, a hat as 14 inserted therein with the crown downward, and the loop released. Upon releasing the loop the spring 12 instantly returns it to its normal position and the hat is securely held in an elevated position, easily accessible and yet free from danger of injury.

It is to be understood, of course that while we have herein shown and described one specific embodiment of our invention changes in form, construction, and method of operation may be made within the scope of the appended claim.

We claim:—

A device of the character described, comprising a plate having upwardly turned front and rear flanges and downwardly extending side flanges, a set screw operatively mounted in the rear flange, a pin mounted in and connecting said side flanges in parallel relation to said rear flange, and a wire loop having both ends twisted together for a distance and then separated and formed into parallel and spaced end portions provided with terminal loops engaging said pin, and a spring coiled upon said pin between said terminal loops and having one end extending rearwardly and engaging the under surface of said plate, and having the other end extending forwardly and engaging the under surface of one of the end portions of the wire loop.

EDMOND A. NOONAN.
WALTER H. KERR.